United States Patent
Ramamoorthy et al.

(10) Patent No.: US 10,409,508 B2
(45) Date of Patent: Sep. 10, 2019

(54) UPDATING OF PINNED STORAGE IN FLASH BASED ON CHANGES TO FLASH-TO-DISK CAPACITY RATIO

(71) Applicant: HEWLETT PACKARD ENTERPRISE DEVELOPMENT LP, Houston, TX (US)

(72) Inventors: Senthil Kumar Ramamoorthy, Sunnyvale, CA (US); Pradeep Shetty, San Jose, CA (US); Mukul Kumar Singh, San Jose, CA (US); Hy Vu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/628,374

(22) Filed: Jun. 20, 2017

(65) Prior Publication Data

US 2017/0285995 A1 Oct. 5, 2017

Related U.S. Application Data

(63) Continuation of application No. 14/812,972, filed on Jul. 29, 2015, now Pat. No. 9,684,467.

(60) Provisional application No. 62/163,075, filed on May 18, 2015.

(51) Int. Cl.
*G06F 3/06* (2006.01)
*G06F 12/0868* (2016.01)
*G06F 12/0802* (2016.01)

(52) U.S. Cl.
CPC .......... *G06F 3/0631* (2013.01); *G06F 3/0604* (2013.01); *G06F 3/067* (2013.01); *G06F 3/0656* (2013.01); *G06F 3/0685* (2013.01); *G06F 12/0802* (2013.01); *G06F 12/0868* (2013.01); *G06F 2212/205* (2013.01); *G06F 2212/222* (2013.01); *G06F 2212/604* (2013.01); *G06F 2212/7203* (2013.01)

(58) Field of Classification Search
CPC .... G06F 3/0631; G06F 3/0604; G06F 3/0656; G06F 3/0685; G06F 12/0802
See application file for complete search history.

(56) References Cited

U.S. PATENT DOCUMENTS

| 9,684,467 B2* | 6/2017 | Ramamoorthy .... G06F 12/0868 |
| 2009/0195928 A1* | 8/2009 | Ogawa ................. G06F 3/0613 360/135 |

(Continued)

*Primary Examiner* — Edward J Dudek, Jr.

(57) ABSTRACT

Methods, systems, and programs are presented for managing a storage device memory. One method includes an operation for receiving a request to pin a volume stored in the storage device. The device includes disk storage and a solid state drive (SSD) cache, where pinned volumes in the storage device have all active volume data in the SSD cache. Further, the method includes an operation for determining the maximum amount of pinnable space in the SSD cache, the maximum amount of pinnable space being calculated based on the sizes of the disk storage and the SSD cache. Further, the method includes operations for determining the available pinning space, which is the maximum amount of pinnable space minus the current amount of pinned data in the SSD cache, and for granting the request to pin the volume when the available pinning space is greater than or equal to a size of the volume.

20 Claims, 10 Drawing Sheets

(56) References Cited

U.S. PATENT DOCUMENTS

| | | | |
|---|---|---|---|
| 2010/0049921 A1* | 2/2010 | Aronovich | G06F 12/0813 |
| | | | 711/130 |
| 2014/0281229 A1* | 9/2014 | Kowles | G06F 12/0223 |
| | | | 711/118 |
| 2016/0239222 A1 | 8/2016 | Shetty et al. | |

* cited by examiner

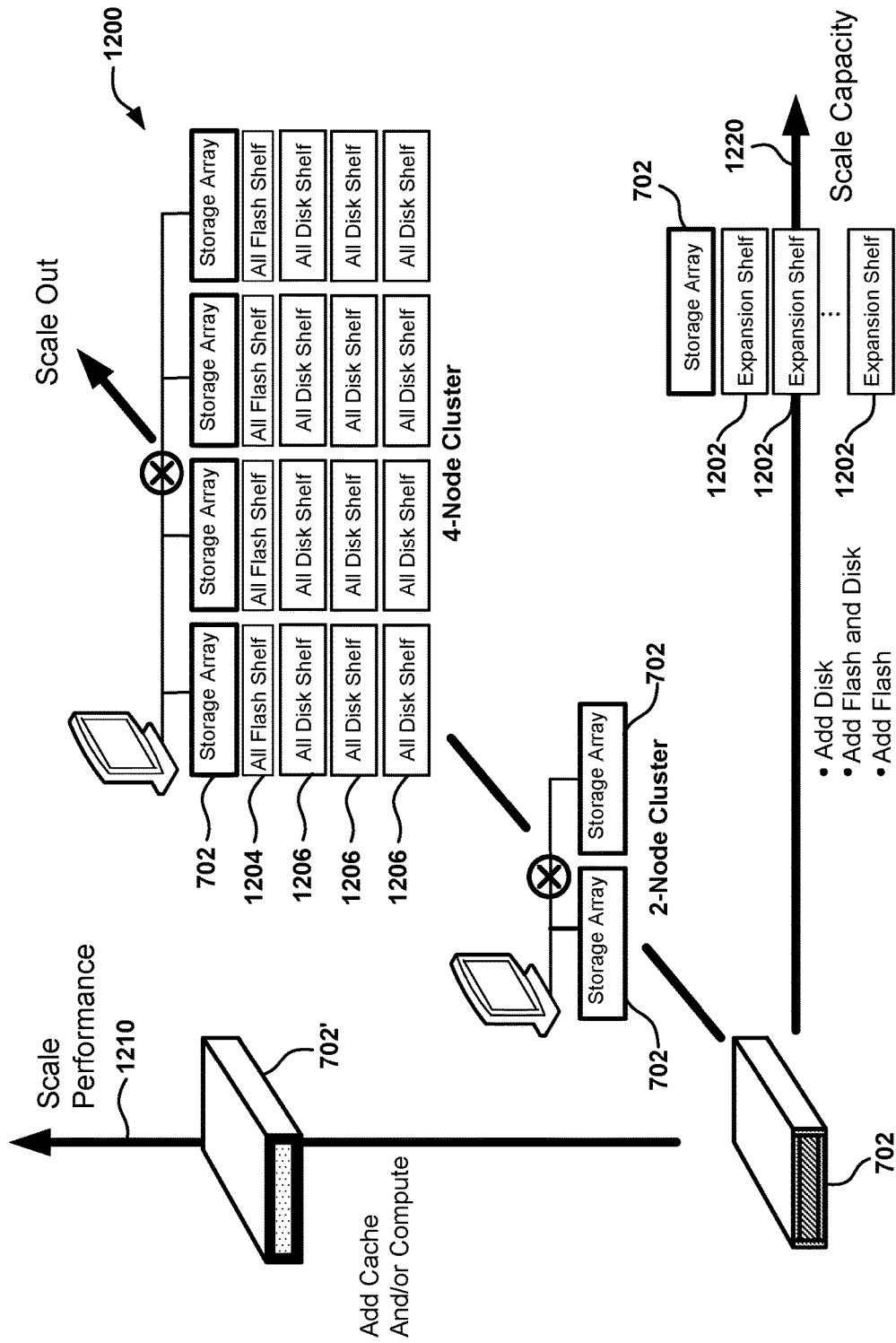

UPDATING OF PINNED STORAGE IN FLASH BASED ON CHANGES TO FLASH-TO-DISK CAPACITY RATIO

CLAIM OF PRIORITY

This application is a continuation of U.S. patent application Ser. No. 14/812,972, filed on Jul. 29, 2015, entitled "MANAGEMENT OF PINNED STORAGE IN FLASH BASED ON FLASH-TO-DISK CAPACITY RATIO," which claims priority from U.S. Provisional Patent Application No. 62/163,075, filed May 18, 2015, and entitled "MANAGEMENT OF PINNED STORAGE IN FLASH BASED ON FLASH-TO-DISK CAPACITY RATIO," all of which are herein incorporated by reference.

BACKGROUND

1. Field of the Invention

The present embodiments relate to methods, systems, and programs for managing resources in a networked storage system, and more particularly, methods, systems, and computer programs for managing a cache memory.

2. Description of the Related Art

Network storage, also referred to as network storage systems or storage systems, is computer data storage connected to a computer network providing data access to heterogeneous clients. Typically network storage systems process a large amount of Input/Output (10) requests, and high availability, speed, and reliability are desirable characteristics of network storage.

One way to provide quick access to data is by utilizing fast cache memory to store data. Because of significant difference in access times between a cache memory and a hard drive, the overall performance of the system is highly impacted by the cache hit ratio. Therefore, it is important to provide optimal utilization of the cache memory in order to have in cache the data in cache that is accessed most often.

Some network storage devices provide the ability to pin data to the cache, thereby guaranteeing that the pinned data will be accessed quickly because it is already stored in cache. However, pinning data to cache reserves valuable cache space that cannot be used for other applications. It is important for the optimum performance of the storage device that there is enough cache space to pin the amount of data requested by the user as well as enough cache space for the general operation of the storage device.

It is in this context that embodiments arise.

SUMMARY

Methods, devices, systems, and computer programs are presented for managing memory allocation in a network storage device. It should be appreciated that the present embodiments can be implemented in numerous ways, such as a method, an apparatus, a system, a device, or a computer program on a computer readable medium. Several embodiments are described below.

In one embodiment, a method for managing memory allocation in a network storage device is provided. The method includes an operation for receiving a request to pin a volume being stored in a network storage device, the network storage device including disk storage and a solid state drive (SSD) cache. The pinned volumes in the network storage device are defined to have all active volume data cached in the SSD cache. Further, the method includes an operation for determining the maximum amount of pinnable space in the SSD cache, where determining the maximum amount of pinnable space includes reserving a first area in the SSD cache based on an amount of disk storage for metadata operations, and determining the maximum amount of pinnable space based on an amount of storage remaining in the SSD cache after reserving the first area. Further yet, the method includes operations for determining an available pinning space that is the maximum amount of pinnable space minus a current amount of pinned data in the SSD cache, and for granting the request to pin the volume when the available pinning space is greater than or equal to a size of the volume.

In another embodiment, a network storage device includes disk storage, a solid state drive (SSD) cache, and a processor. The pinned volumes in the network storage device are defined to have all active volume data cached in the SSD cache. Further, the processor is operable to receive a request to pin a volume in the network storage device, the processor determining a maximum amount of pinnable space in the SSD cache in response to receiving the request. The processor determines the maximum amount of pinnable space by reserving a first area in the SSD cache based on an amount of disk storage, and by determining the maximum amount of pinnable space based on an amount of storage remaining in the SSD cache after reserving the first area. Additionally, the processor determines an available pinning space, which is the maximum amount of pinnable space minus a current amount of pinned data in the SSD cache. Further, the processor grants the request to pin the volume when the available pinning space is greater than or equal to a size of the volume.

In yet another embodiment, a non-transitory computer-readable storage medium storing a computer program for managing memory allocation in a network storage device is provided. The computer-readable storage medium includes program instructions for receiving a request to pin a volume being stored in a network storage device, the network storage device including disk storage and a solid state drive (SSD) cache, where pinned volumes in the network storage device are defined to have all active volume data cached in the SSD cache. Further, the storage medium includes program instructions for determining a maximum amount of pinnable space in the SSD cache, where determining the maximum amount of pinnable space includes reserving a first area in the SSD cache based on an amount of disk storage, and determining the maximum amount of pinnable space based on an amount of storage remaining in the SSD cache after reserving the first area. In addition, the storage medium further includes program instructions for determining an available pinning space that is the maximum amount of pinnable space minus a current amount of pinned data in the SSD cache, and program instructions for granting the request to pin the volume when the available pinning space is greater than or equal to a size of the volume.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 9 is an example of the flexibility of the storage array, which can be expanded for scaling performance and for scaling capacity.

DETAILED DESCRIPTION

The following embodiments describe methods, devices, systems, and computer programs for managing memory allocation in a network storage device. It will be apparent, that the present embodiments may be practiced without some or all of these specific details. In other instances, well-known process operations have not been described in detail in order not to unnecessarily obscure the present embodiments.

Figure 1A:
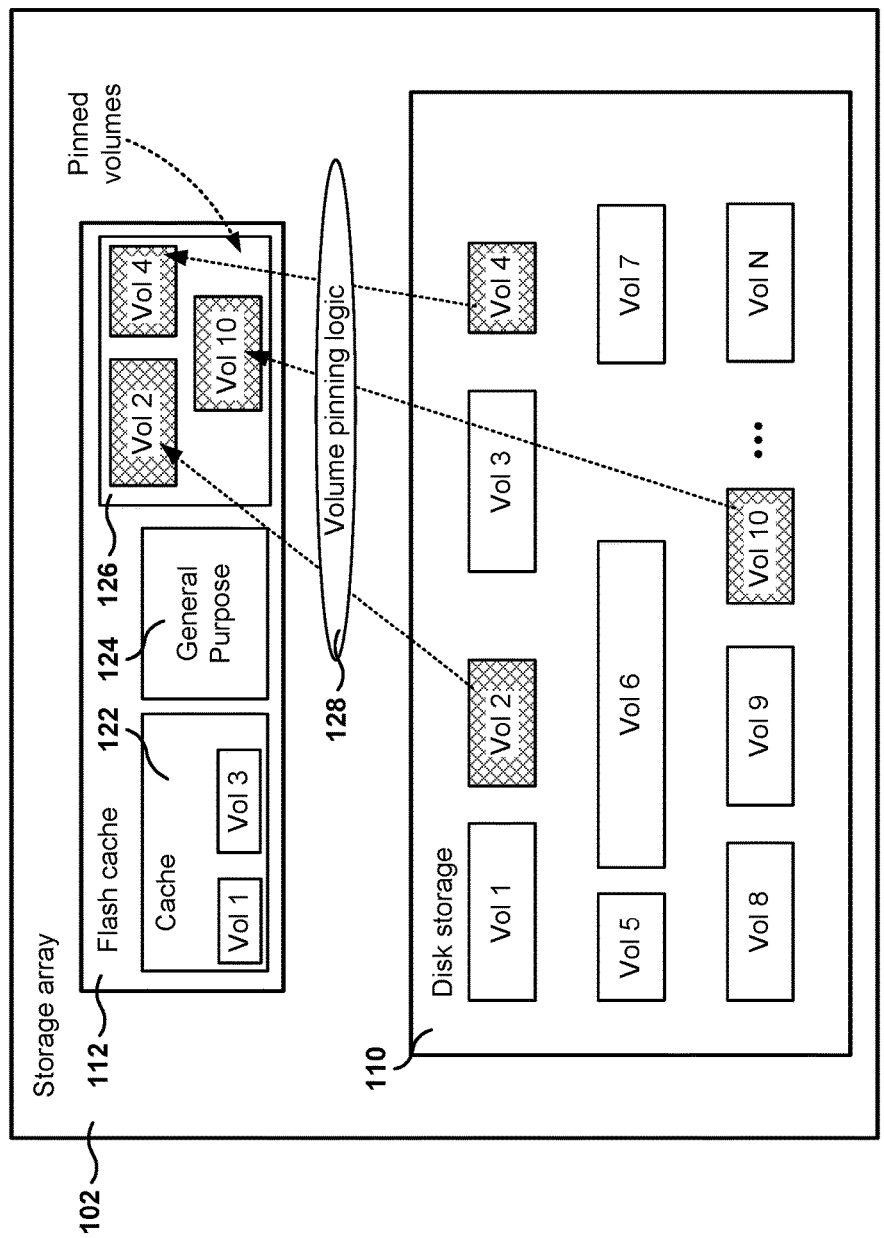
FIG. 1A illustrates a storage array with pinned volumes, according to one embodiment.

FIG. 1A illustrates a storage array with pinned volumes, according to one embodiment. As used herein, the network storage device is referred to as a storage array, and the data within the storage array 102 is organized in volumes (e.g., a drive), where each volume is a single accessible storage area.

Cache pinning of a volume is the ability to always keep the active blocks (i.e., data) of the pinned volume in the cache. Active data is the data accessible by a client when accessing the volume by providing a logical address within the volume, therefore, the data for snapshots of the volume is not considered active data. In one embodiment, once a volume is marked as pinned by the user, there are two possible approaches to populate the data of the volume into cache. The first approach is proactive population, where the volume is proactively scanned to determine if any of the volume blocks are not in cache, and in that case, copying (i.e., populating) the blocks missing to the cache. In the second approach, all writes to the volume after the volume is marked as pinned will be cached and pinned, and read-misses to the volume will be cached and pinned. The goal is to eventually have all the blocks of the volume pinned in the SSD cache.

One solution for managing the pinning of blocks in a volume requires tracking the frequency of access to blocks in memory to identify a temperature of the blocks, where the pinned blocks are assigned the maximum temperature. This solution is described in U.S. patent application Ser. No. 14/623,731, filed Feb. 17, 2015, and entitled "ACCESS-BASED EVICTION OF BLOCKS FROM SOLID STATE DRIVE CACHE MEMORY," which is incorporated herein by reference.

With reference to FIG. 1A, the storage array 102 includes disk storage 110 and a flash cache 112 (e.g., SSD). In one embodiment, one or more of the volumes in the disk storage are pinned volumes (e.g., volumes 2, 4, and 10), therefore, the data for these volumes is defined to be always kept in cache. The flash cache 112 includes a pinned data area 126 for storing pinned volumes, a general cache area 122 for caching data for other volumes, and a general purpose area 124 for use by the storage array 102 (e.g., storing indices used to access data).

In one embodiment, the data for all the volumes is always kept in disk storage 110, therefore, if any of the data is lost from the flash cache, the data will not be lost as there is always a copy in disk storage.

It is noted that the data stored in the disk storage in flash cache will not necessarily be in contiguous blocks, as the data for the different blocks in the volumes may be scattered throughout disk storage or flash cache. FIG. 1A shows a logical representation of volume storage, not necessarily a representation of where the volumes are physically stored.

Volume pinning logic 128 includes logic for the management, operation, and storage of pinned data in the flash cache. As described in more detail below, the volume pinning logic 128 determines, for example, how much data can be pinned or when to disable pinning to guarantee the optimum performance of the storage array.

Figure 1B:
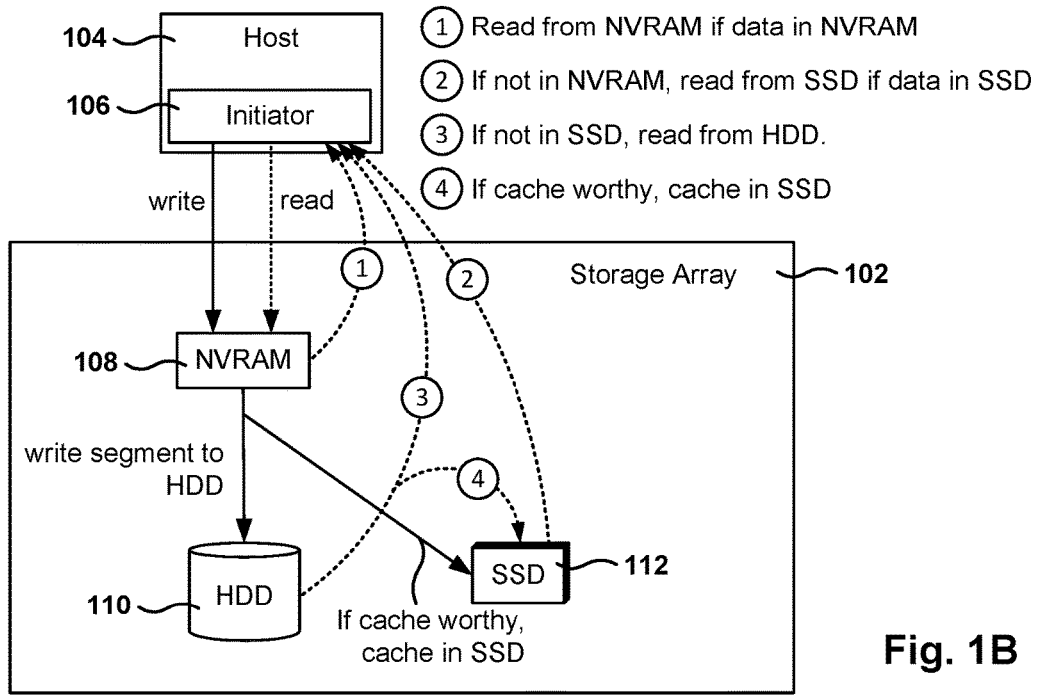
FIGS. 1B-1C illustrate the read and write paths within the storage array, according to several embodiments.
Figure 1C:
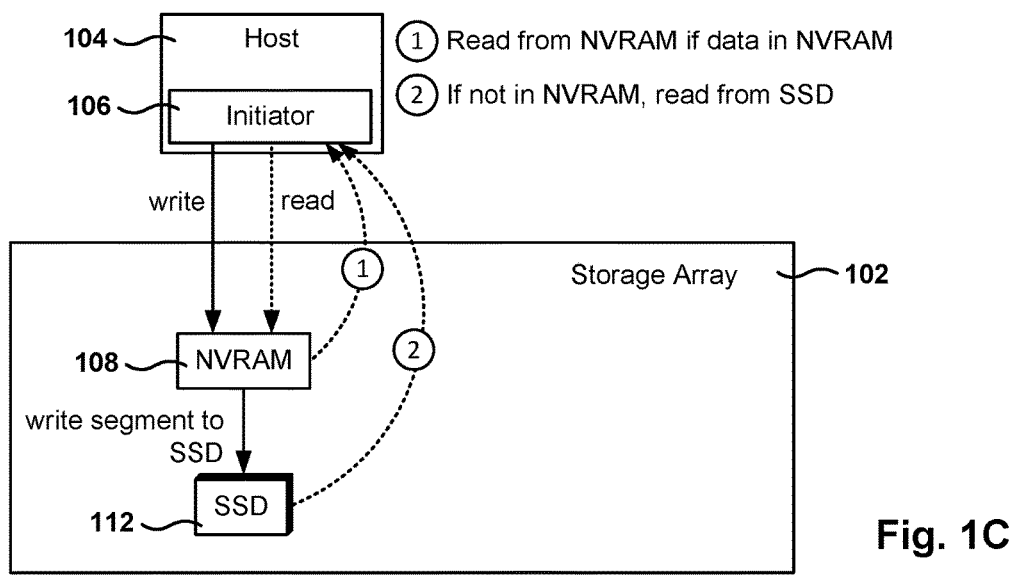

FIGS. 1B-1C illustrate the read and write paths within the storage array, according to several embodiments. FIG. 1B shows the write path for a hybrid system with SSDs and HDDs, where the initiator 106 in the host 104 sends the write request to the network storage device, also referred to herein as storage array 102. As the write data comes in, the write data is written into NVRAM 108, and an acknowledgment is sent back to the initiator (e.g., the host or application making the request). In one embodiment, storage array 102 supports variable block sizes. Data blocks in the NVRAM 108 are compressed and grouped together to form a segment that includes a plurality of data blocks, which may be of different sizes. The segment is compressed and then written to HDD 110. In addition, if the segment is considered to be cache-worthy (i.e., important enough to be cached or likely to be accessed again) the segment is also written to the solid state drive (SSD) cache 112. In one embodiment, the segment is written to the SSD 112 in parallel while writing the segment to HDD 110.

In one embodiment, the performance of the write path is driven by the flushing of NVRAM 108 to disk 110. With regards to the read path, the initiator 106 sends a read request to storage array 102. The requested data may be found in any of the different levels of storage mediums of the storage array 102. First, a check is made to see if the data is found in RAM (not shown), which is a shadow memory of NVRAM 108, and if the data is found in RAM then the data is read from RAM and sent back to the initiator 106. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 112 and sent to the initiator 106. If the data is not found in the NVRAM 108 nor in the flash cache 112, then the data is read from the hard drives 110 and sent to the initiator 106. In addition, if the data being served from hard disk 110 is cache worthy, then the data is also cached in the SSD cache 112.

FIG. 1C illustrates the read and write paths for an all-flash array having SSDs for permanent storage and no HDDs. The write path includes writing the incoming data to NVRAM 108 and later saving the data in SSD 112. The read path is also simplified as compared to the hybrid system of FIG. 1B, where the data is read from NVRAM 108 if available in NVRAM, and if the data is not found in NVRAM 108 then the data is read from SSD 112.

Figure 2:
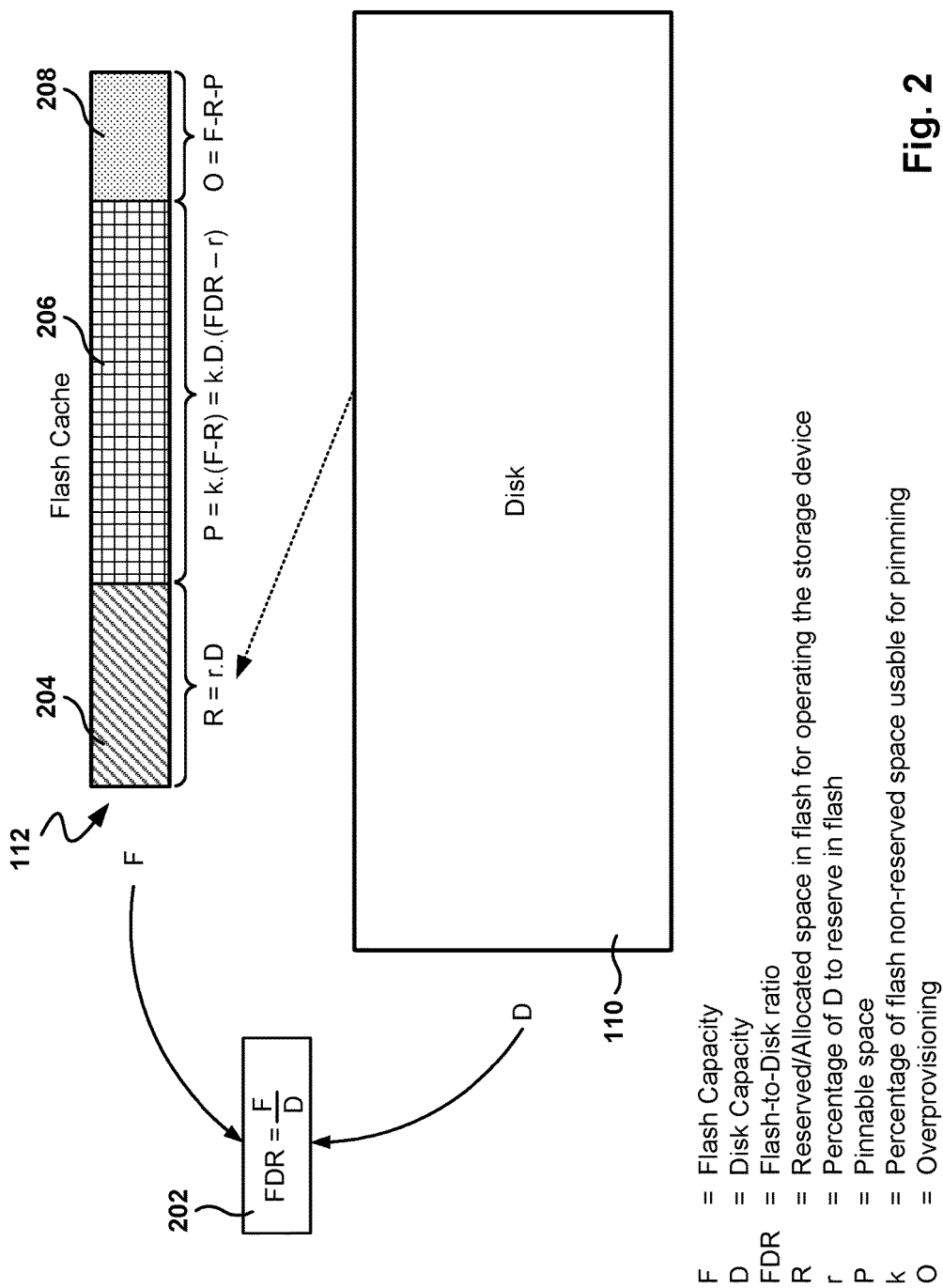
FIG. 2 illustrates the allocation of pinnable space in the SSD cache based on the flash-to-disk ratio (FDR), according to one embodiment.

FIG. 2 illustrates the allocation of pinnable space in the SSD cache based on the flash-to-disk ratio (FDR), according to one embodiment. Flash capacity F is the total amount of space in the flash storage (e.g., 10 TB), disk capacity D is equal to the total amount of disk storage (e.g., 100 TB), and flash-to-disk ratio (FDR) is equal to flash capacity divided by disk capacity (F/D, e.g., 0.1). Further yet, pin capacity of a volume is the amount of flash space that is reserved for the volume. Pinnable space P is the maximum amount of flash space that is available for pinning volumes, and available pinnable capacity $P_{available}$ is the amount of flash space that is currently available for pinning volumes. Therefore, the available pinnable capacity is equal to the total pinnable capacity minus the amount of pinnable space already in use by volumes being pinned in the storage device. In addition, reserved space R is flash space reserved or allocated for general purpose use of unpinned volumes and system resources (e.g., metadata caching). In addition, overprovisioning space O is flash space that is not pinnable, besides the reserved/allocated space R. For example, overprovisioning is useful to improve efficiency of the flash garbage collection process, to guarantee that there is an adequate amount of flash space during garbage collection.

In one embodiment, the reserved space R is a function of the disk storage D, therefore, $R=f_r(D)$, where $f_r$ is a predetermined function. In one embodiment, $f_r$ is based on a percentage r of D (e.g., r is 4%), and R is calculated according to the following equation:

$$R=r \cdot D \quad (1)$$

Where r is a predetermined constant. For example, if r=0.04, then R is 4 percent of disk storage D. In one embodiment, the remaining space in flash (F−R) is reserved for pinning, but in another embodiment, (F−R) is not directly made available for pinning because the system may run into performance problems, as all the segments need not be completely full with live pinned data. Hence overprovisioning is required to make sure that enough pinnable cache capacity is reserved. Segments with dead data will be cleaned up in the back ground for efficient utilization of flash.

Therefore, the pinnable space P is calculated by allocating only a subset of (F−R). In one embodiment, P is calculated according to the following equation:

$$P=f_p(F-R) \quad (2)$$

Where $f_p$ is a function of (F−R). In one embodiment, $f_p$ is defined by a constant k which is multiplied by (F−R), where k is defined as the percentage of non-reserved flash space that is usable for pinning. In this case, P is calculated according to the following equation:

$$P=k(F-R) \quad (3)$$

For example, if k is equal to 0.75, three quarters of (F−R) may be used for pinning. In addition, if equation (3) is multiplied and divided by D, equation (3) may be rewritten as follows:

$$P=k \cdot D \cdot (F/D-R/D) \quad (4)$$

$$P=k \cdot D \cdot (FDR-r) \quad (5)$$

Equation (5) defines that the pinnable space is equal to a predetermined constant k times the disk space D times the difference between the flash-to-disk ratio FDR and the percentage of disk to reserve in flash r. This means, that the pinnable space is a function of the capacity of the disk storage D and the FDR. As a result, the more disk storage, the more space is reserved in flash for the operation of the storage device and the less space there is available for pinning.

However, if the flash space F is smaller than the desired reserved space R, then P would be negative. Or in other words, if FDR is greater than r, then equation 5 would result in a negative P. However, P shouldn't be negative, just zero. Therefore, equation (5) can be modified to avoid a negative P as follows:

$$P=\max(k \cdot D \cdot (FDR-r),0) \quad (6)$$

Where max is the maximum function. Further, it is noted that overprovisioning O is equal to (F−R−P). There are different storage devices with different FDRs, such as 2%, or 10%, or 20%, etc. In some of these devices, it is not possible to do any volume pinning because there is not even space to fit all the indices in the flash. In one embodiment, it is estimated that at least 4% of FDR is needed to do volume pinning. In this case, 4% of the FDR is reserved in flash for general purposes and operation of the storage array. From the rest of the space in the flash memory, a predetermined percentage (e.g., 75%) is reserved for volume pinning.

It is noted that the embodiments described above are exemplary. Other embodiments may utilize different equations for R and P. For example, R may be equal to a constant reserved space plus a percentage of disk, of R may be based on another non-linear equation based on D, as long as when D grows, the amount of reserved spaced R also grows. Further, P may be calculated based on other equations as a function of F and R, as long as P is directly related to F and inversely related to R.

In one embodiment, r is in the range from 1% to 5%, and in another embodiment, r is in the range from 4% to 50%, although other values may be also used accordingly to the principles presented herein. Further, in another embodiment, k is in the range from 60% to 99%, although other values are also possible. The embodiments illustrated in FIG. 2 should therefore not be interpreted to be exclusive or limiting, but rather exemplary or illustrative.

For example, in a system were the disk capacity D is 100 TB, the flash capacity F is 10 TB, k is 0.75, and r is 0.04, FDR would be equal to 10/100, or 10%. Applying equation (5) to calculate the pinnable space P results in 4.5 TB:

P=0.75×100 TB×(0.1−0.04)=4.5 TB of pinnable space.

In this system, 4% of usable disk capacity is set aside in flash for storage device operations (e.g., storing data indices and other general purpose data). Of the remaining space in flash, 25% is set aside for over-provisioning and other purposes.

An administrator may add flash space (e.g., 1 TB) in the hope of pinning 1 TB of data, but this is not realistic, because of the operation of the storage array and flash memory. By utilizing equation (6), it is possible to notify the customer how much pinnable space can be allocated for pinning when adding additional flash memory. This way, the performance of the storage array is not compromised by guaranteeing overprovisioning. This way, a customer that wants to pin an additional 1 TB of data, will be notified that 1.33 TB of flash storage needs to be added (when k is 0.75), because 1.33× 0.75 is equal to 1 TB of additional pinnable space.

Figure 3:
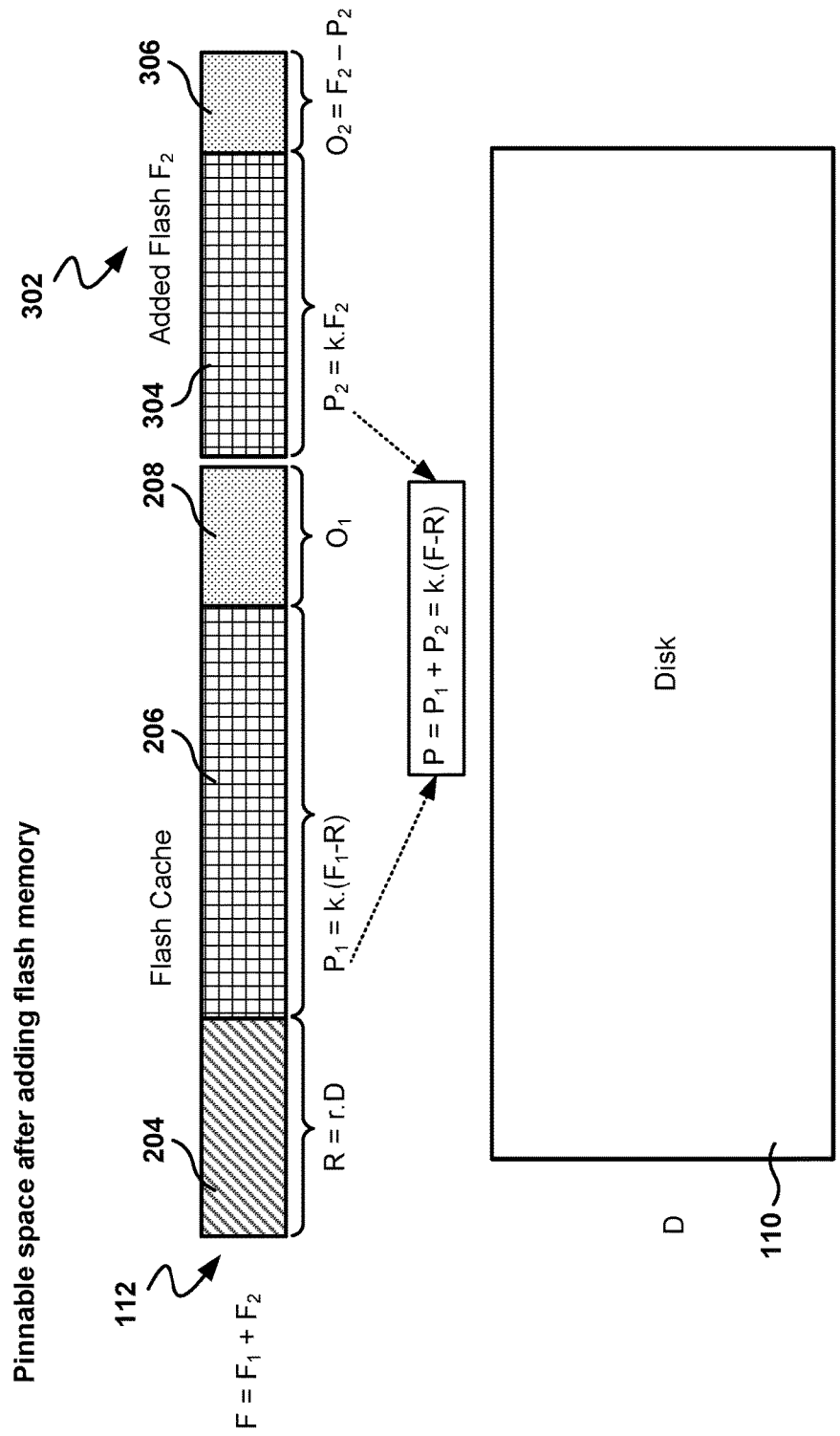
FIG. 3 illustrates the increase in pinnable space after adding flash memory, according to one embodiment.

FIG. 3 illustrates the increase in pinnable space after adding flash memory, according to one embodiment. As discussed above, depending on the FDR ratio, it is possible to determine whether to do data pinning, and how much data pinning could safely be done. Flash space (e.g., SSDs) may be added or taken away over time, as well as disk space, resulting in changes to the FDR. The system recalculates the amount of pinnable space each time there is a change in the amount of disk storage or flash storage. Based on the recalculated FDR, the system determines if more pinnable space can be allocated, or if pinning may have to be disabled because FDR has decreased, or if some other operation has to be performed to guarantee the stable operation of the storage device.

For example, if the system loses part of the SSD memory, then the disk will be scanned to restore lost pinned data in flash (e.g., index data or pinned data), so the system has again all the data in the SSD pinned (or cached) that is required. The storage array makes sure that the storage array will work properly when changes in storage take place, so if the FDR is lowered, volume pinning may have to be turned off, or the amount of data that can be pinned will be reduced, to guarantee that the storage array works properly. This doesn't necessarily mean that the volumes will be automatically unpinned, only that the system will not guarantee the pinned status of the unpinned volumes. If later, the system adds more flash space, then the system will re-pin data that was unpinned.

For example, FIG. 3 illustrates the results of adding flash space to the storage array. The new amount of flash space F is equal to the previous amount of flash space $F_1$ plus the new amount of flash space $F_2$. Since the disk amount has not changed, the reserve amount of space R does not change either (when R=rD).

To calculate the new amount of pinnable space P, the original amount of pinnable space $P_1$ is added to the new amount of pinnable space $P_2$, where $P_2=kF_2$. Thus, the delta in pinnable space is $kF_2$. Of course, the total amount of pinnable space P is still equal to k(F−R).

Figure 4:
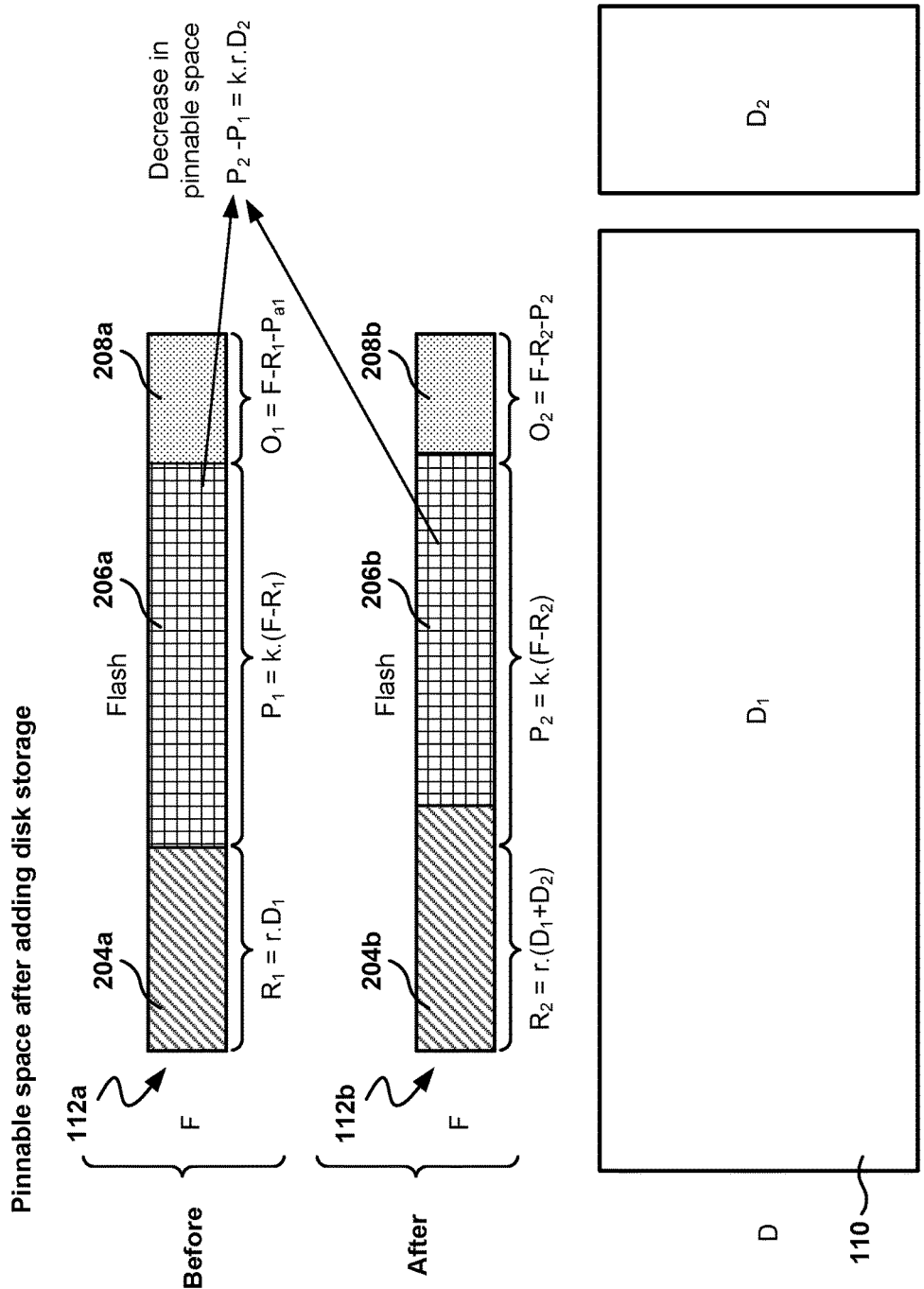
FIG. 4 illustrates the decrease in pinnable space after adding disk storage, according to one embodiment.

FIG. 4 illustrates the decrease in pinnable space after adding disk storage, according to one embodiment. When activating disk storage (e.g., a shelf of disks), the amount of pinnable capacity needs to be recalculated, and if adding the disk space would bring the pinnable capacity below the current size of pinned volumes, the activation should fail or pinning may have to be restricted.

The possibility of changing the amount of storage is a challenge for guaranteeing that volumes that have to be pinned can be pinned. By recalculating FDR and the amount of pinnable space P, it is possible to address different possible problems to guarantee pinning, or to let the customer know how much data can be pinned, or even to disallow adding disk storage.

In the example of FIG. 4, disk storage $D_2$ has been added, therefore, the new amount of disk storage D is equal to the original amount of disk storage $D_1$ plus $D_2$. Flash allocation 112a illustrates the amount of pinnable space P before adding disk capacity, as illustrated earlier with reference to FIG. 2.

The new allocation of flash space 112b indicates that $R_2$ is now equal to $r(D_1+FD_2)$, therefore, the reserved space in flash has increased by $rD_2$ due to the addition of $D_2$. Since R has increased, then the amount of pinnable space $P_2$ has to be reduced. The new $P_2$ is equal to $k(F−R_2)$, and the loss in pinnable space $(P_2−P_1)$ is equal to $k(F−R_1)−k(F−R_2)$, or $kF−kR_1−kF+kR_2$, or $k(R_2−R_1)$, or $k(rD_1+rD_2−rD_2)$, or $krD_2$. This means that by adding more disk space $D_2$, the FDR changes and the system requires more space in flash for the general operation of the array, which means a reduction in the amount of pinnable space of $krD_2$.

By recalculating the amount of pinnable space, the system is able to adapt to changes in the storage space, which means that the system has a high level of adaptability, making sure that pinning is reliable and that pinning is guaranteed. The system needs to handle all possible cases of changes in the FDR, such as adding or removing disk shelves, adding or removing flash shelves, adding or removing arrays to a pool, etc.

Figure 5:
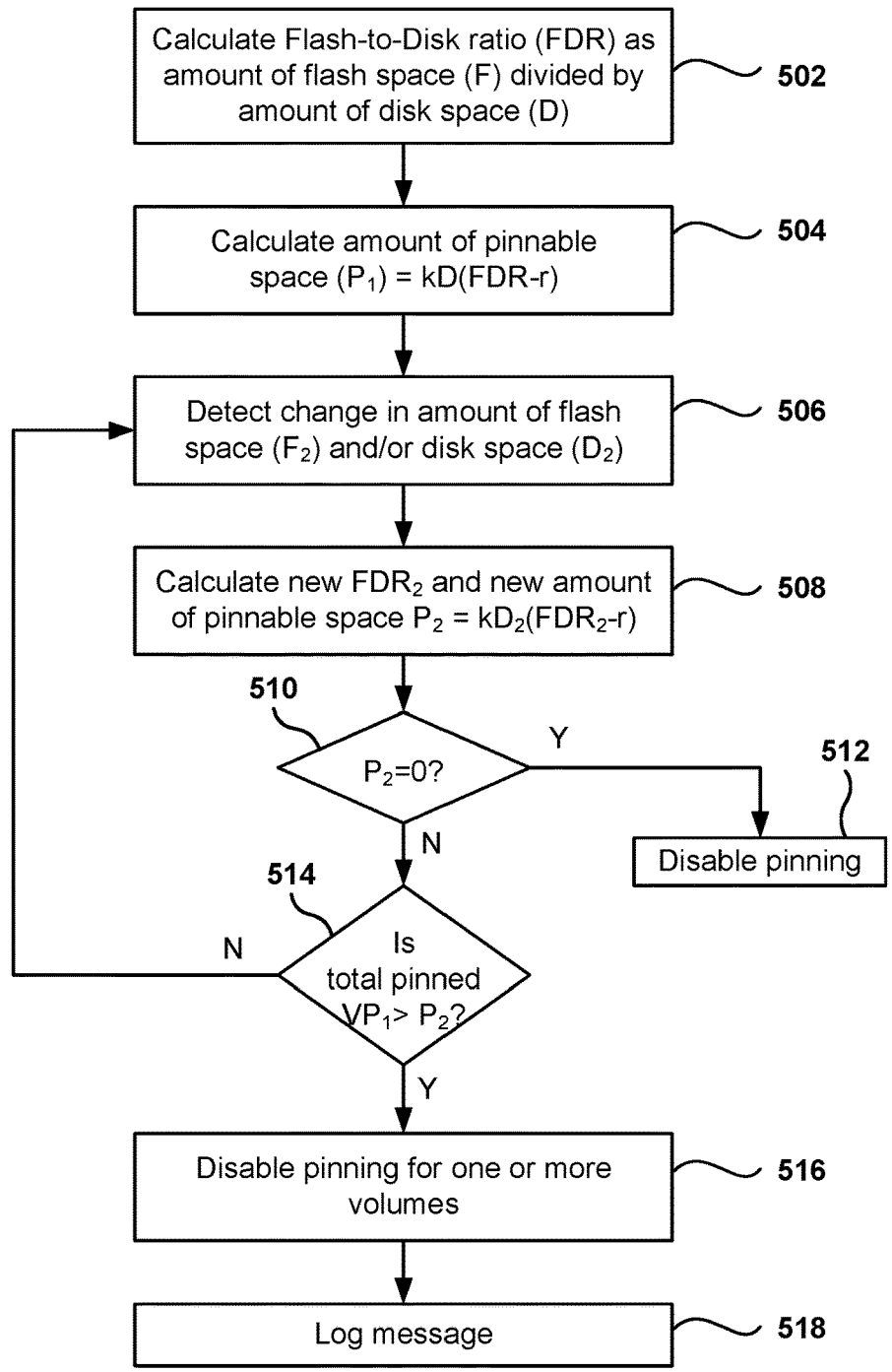
FIG. 5 is a flowchart for managing pinnable space in the SSD cache after detecting a change in the amount of flash memory or disk space, according to one embodiment.

FIG. 5 is a flowchart for managing pinnable space in the SSD cache after detecting a change in the amount of flash memory or disk space, according to one embodiment. While the various operations in this flowchart are presented and described sequentially, one of ordinary skill will appreciate that some or all of the operations may be executed in a different order, be combined or omitted, or be executed in parallel.

In operation 502, the flash-to-disk ratio FDR is calculated as F divided by D, as described above with reference to FIG. 2. From operation 502, the method flows to operation 504 where the initial amount of pinnable space $P_1$ is calculated with equation (6) described above, $P_1=\max(kD(FDR−r),0)$.

From operation 504, the method flows to operation 506, where a change is detected in the amount of flash space or disk space. The new amount of flash space is referred to as $F_2$ and the new amount of disk space is referred to as $D_2$.

In operation 508, the new $FDR_2$ on the new amount of pinnable space $P_2$ are calculated, utilizing equation (6). Therefore, $P_2=\max(kD_2(FDR_2−r), 0)$. From operation 508, the method flows to operation 510 where a check is made to determine if $P_2$ is equal to 0, meaning that there is no space for pinning.

If $P_2$ is equal to 0, the method flows to operation 512, where pinning is disabled, unless it was already disabled. If $P_2$ is not equal to 0, the method flows to operation 514, where a check is made to determine if the total current amount of pinned data (e.g., pinned volumes) $VP_1$ is greater than the new amount of pinnable space $P_2$.

In operation 516, if the total current amount of pinned data $VP_1$ is greater than $P_2$, this means that there is not enough pinnable space to pin all the volumes currently pinned, and in operation 516, pinning is disabled for the system or for one or more volumes, in order to bring the amount of pinned data $VP_1$ below the amount of pinnable space $P_2$.

In one embodiment, pinning is disabled for all volumes, but in another embodiment, pinning is selectively disabled for some volumes but not for others. This means that if FDR is lowered, a message is sent to the administrator (operation 518) stating that pinning is not possible for one or more volumes. In another embodiment, the system may prevent the storage administrator from adding a disk shelf that would disable pinning for some volumes. In one embodiment, the amount of pinnable space P is reported to the administrator in order to assist in the configuration to pin volumes.

In yet another embodiment, the administrator may be notified that, in order to add disk storage, the administrator must first reconfigure pinning in order to add the disk storage. This means, that the administrator may have to turn off pinning for one or more volumes.

In general, the storage device doesn't know which volumes are important, so it is up to the customer to prioritize which volumes are more important than others. However, in other embodiments, the storage device may utilize a priority scheme to assign different priorities to the different volumes. In this case, changes in the storage configuration may result in the un-pinning of low priority volumes, while allowing high priority volumes to remain pinned. For example, in one embodiment, the priority scheme is defined by the system administrator.

In yet another embodiment, the volumes may be prioritized according to the creation date of the volume, therefore, if changes require the un-pinning of certain volumes, the most recently pinned volumes will be unpinned. In another embodiment, the priority of the volumes may be defined according to the frequency of access to the volumes, which means that, when un-pinning of a volume is required, the volume with the least frequent access will be unpinned.

It is noted that the embodiments illustrated in FIG. 5 are exemplary. Other embodiments may utilize different responses to changes in the FDR, or calculate the pinnable space with different formulas, etc. The embodiments illustrated in FIG. 5 should therefore not be interpreted to be exclusive or limiting, but rather exemplary or illustrative.

Figure 6:
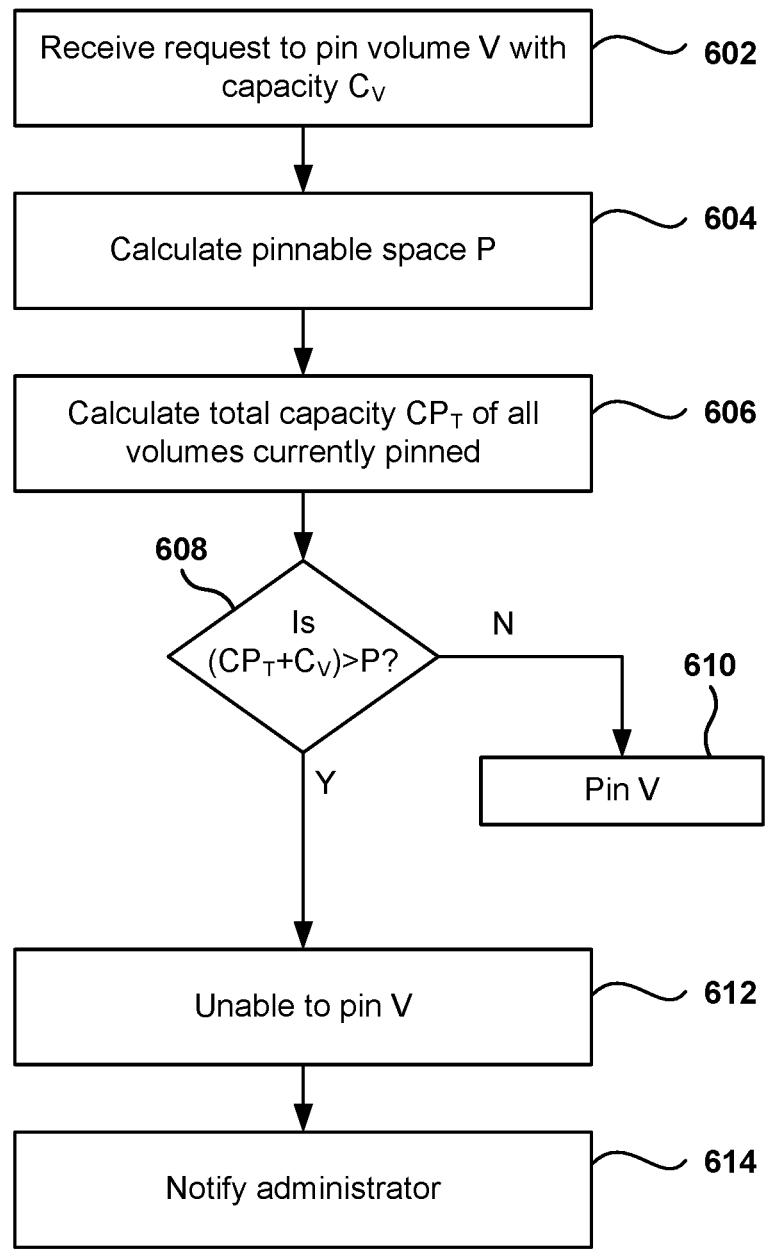
FIG. 6 is a flowchart for processing a customer request to pin a volume, according to one embodiment.

FIG. 6 is a flowchart for processing a customer request to pin a volume, according to one embodiment. While the various operations in this flowchart are presented and described sequentially, one of ordinary skill will appreciate that some or all of the operations may be executed in a different order, be combined or omitted, or be executed in parallel.

In operation 602, a request is received to pin a volume V with capacity (i.e., size) $C_v$. From operation 602, the method flows to operation 604, where the pinnable space P is calculated (unless P had been previously calculated).

Further, from operation 604, the method flows to operation 606 where the total capacity $CP_T$ of all volumes currently pinned is calculated. In other words, $CP_T$ is the amount of storage already committed to pinning in the storage device.

From operation 606, the method flows to operation 608 where a check is made to determine if it is possible to pin volume V without exceeding the amount of pinnable space P. That is, a check is made to determine if ($CP_T$+CV) is greater than P.

If it is possible to pin volume V without exceeding P, then the method flows to operation 610 to pin volume V. Otherwise, if it is not possible to pin volume V because of insufficient pinnable space, the method flows to operation 612 where the request is denied and volume V is not pinned. Further, in operation 614 the administrator is notified that it wasn't possible to pin volume V.

In a scale out system, there are multiple arrays with different disk and flash capacities. In one embodiment, the total pinnable amount is calculated for the pool of storage arrays. The FDR for each of the arrays is calculated and then the minimum FDR, $FDR_{min}$, is calculated from all the FDRs. The minimum FDR is then multiplied by total disk capacity of the pool to determine total pinnable capacity. In one embodiment, the minimum FDR is then multiplied by the number of storage arrays N in the pool, and then the total pinnable capacity for the scale out system is calculated based on $N \cdot FDR_{min}$. This way, there is no risk that some arrays have more FDR and others have less FDR, and the system doesn't have to be forced to pin some volumes in some arrays. The system will operate better if there is freedom to place any volume in any array or arrays.

In one embodiment, before migrating data from a pinned volume to a different array, the systems checks if there is space to pin that data in the destination array. If there is not enough space for pinning in the destination array, the data will not be migrated.

Figure 7:
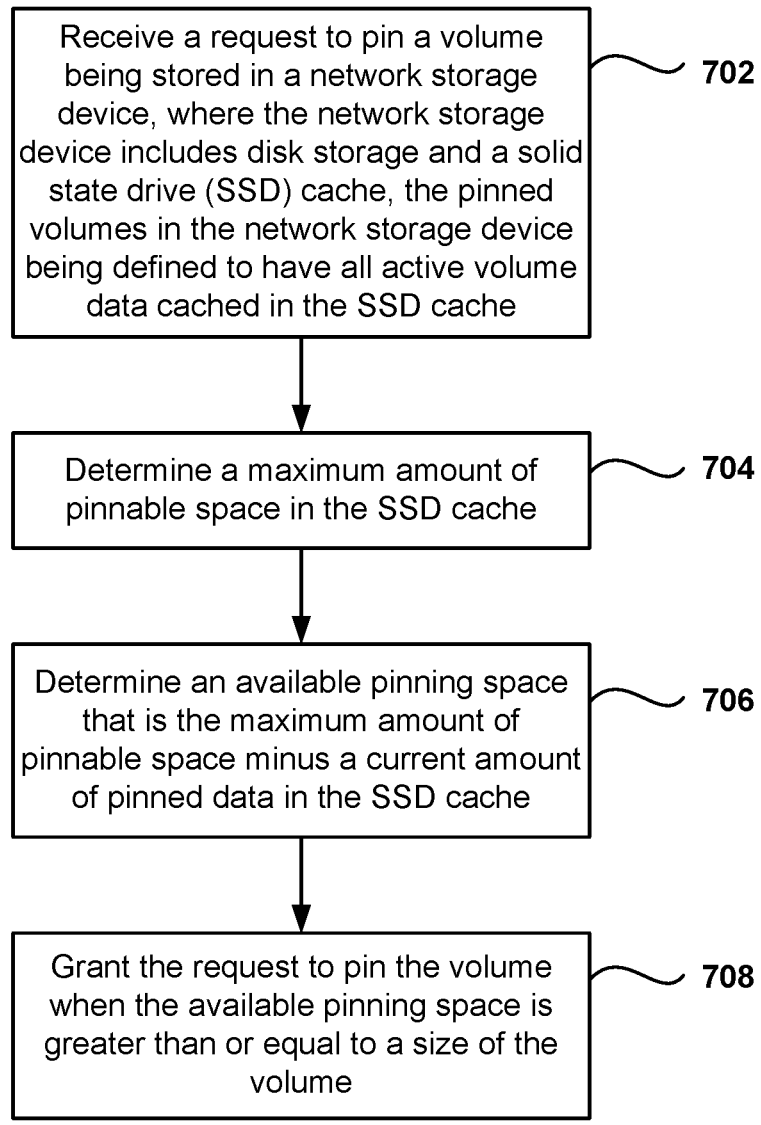
FIG. 7 is a flowchart for managing memory allocation in a network storage device, according to one embodiment.

FIG. 7 is a flowchart for managing memory allocation in a network storage device, according to one embodiment. While the various operations in this flowchart are presented and described sequentially, one of ordinary skill will appreciate that some or all of the operations may be executed in a different order, be combined or omitted, or be executed in parallel.

Operation 702 is for receiving a request to pin a volume being stored in a network storage device. The network storage device includes disk storage and a solid state drive (SSD) cache, where pinned volumes in the network storage device are defined to have all active volume data cached in the SSD cache.

From operation 702, the method flows to operation 704, where a maximum amount of pinnable space P in the SSD cache is determined. In one embodiment, determining the maximum amount of pinnable space P includes reserving a first area in the SSD cache based on an amount of disk storage, and determining the maximum amount of pinnable space based on an amount of storage remaining in the SSD cache after reserving the first area.

From operation 704, the method flows to operation 706 where an available pinning space is then determined, the available pinning space being equal to the maximum amount of pinnable space minus a current amount of pinned data in the SSD cache. Further, from operation 706, the method flows to operation 708, where the request to pin the volume is granted when the available pinning space is greater than or equal to the size of the volume. If there is not available pinning space for pinning the volume, the request is denied. In one embodiment, instead of using the size of the volume to reserved pinning space, a nominal size of the volume is utilized, where the nominal size is equal to the size of the volume times an allocated quota for the volume. For example, a 1 TB volume with 50% quota, has a nominal size of 500 GB, which would be the amount of space reserved for pinning this volume.

Figure 8:
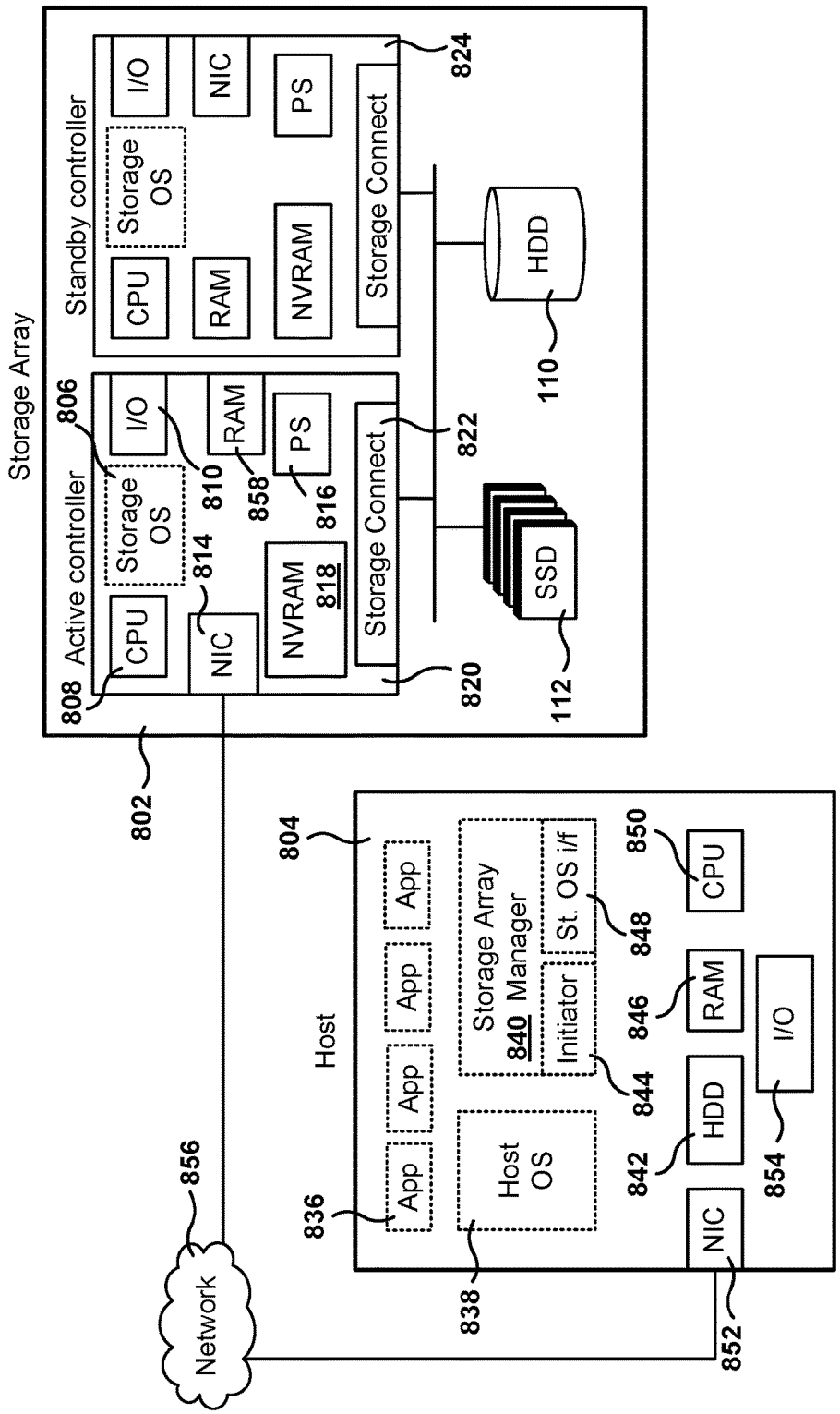
FIG. 8 illustrates the architecture of an all-flash storage array, according to one embodiment.

FIG. 8 illustrates the architecture of an all-flash storage array, according to one embodiment. In one embodiment, the storage array 802 includes an active controller 820, a standby controller 824, one or more SSDs 112, and disk storage 110. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to HDD 110 and optionally to SSD 112.

In addition, the active controller 820 further includes CPU 808, general-purpose RAM 858 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 112. In one embodiment, standby controller 824 includes the same components as active controller 820.

Active controller 820 is configured to execute one or more computer programs stored in RAM 858. One of the computer programs is the storage operating system (OS) used to perform operating system functions for the active controller device. In some implementations, one or more expansion shelves may be coupled to storage array 802 to increase storage capacity.

Active controller 820 and standby controller 824 have their own NVRAMs, but they share SSDs 112. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 112 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

FIG. 9 is an example of the flexibility of the storage array, which can be expanded for scaling performance and for scaling capacity. In this illustration, the storage array can be adjusted to add cache and/or compute resources to define a more powerful storage array 702'. In one example, instead of upgrading the storage array 702, an upgraded storage array 702 can take its place to provide additional processing power (e.g., more powerful CPUs, higher capacity NVRAM, higher capacity DRAM, improved storage enclosure routing and buses, improved fan speeds, modified enclosure [e.g., chassis] heights [u1, U2, U3, etc.]), different power supplies, and/or other redundancy and/or memory and/or processing infrastructure.

In one embodiment, if the storage array requires additional disk or storage or flash storage memory, the storage array can be expanded to scale out by adding expansion shelves 1202 to the storage array 702. As discussed above, the expansion shelves 1202 may be defined by all-disk shelves (ADS) or all-flash shelves (AFS), or combinations of ADS and AFS shelves In a further example, the flexibility of the storage array 702 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 702, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be read later by a computer system. Examples of the non-transitory computer readable storage medium include hard drives, network attached storage (NAS), read-only memory, random-access memory, CD-ROMs, CD-Rs, CD-RWs, magnetic tapes, and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method for managing memory allocation in a network storage device, the method comprising:

calculating, by a processor, an amount of pinnable storage space in a cache of a network storage device after reserving a space in the cache for caching, the network storage device including the cache and other storage to store one or more volumes, wherein pinned volumes of the one or more volumes of the other storage are to have all active volume data cached in the cache;

detecting, by the processor, a change in an amount of the other storage in the network storage device;

determining an updated capacity of the other storage;

determining an updated ratio of a capacity of the cache to the capacity of the other storage based on the updated capacity of the other storage;

recalculating the reserved space in the cache based on the updated capacity of the other storage to update the reserved space in the cache for caching, wherein an updated remaining space in the cache is based on the updated reserved space in the cache;

updating the amount of pinnable storage space in the cache based on the updated capacity of the other storage and the updated ratio; and in response to a determination that a total amount of pinned data is greater than the updated amount of pinnable storage space in the cache, disabling, by the processor, a number of the pinned volumes in the network storage device to bring the total amount of pinned data to below the updated amount of pinnable storage space.

2. The method of claim 1, wherein updating the amount of pinnable storage space in the cache comprises:

determining the updated amount of pinnable storage space in the cache based on the updated remaining space.

3. The method of claim 2, further comprising:

setting the updated amount of pinnable storage space to zero when the updated amount of pinnable storage space initially determined is negative; and disabling pinning to the cache of volumes stored in the other storage.

4. The method of claim 2, wherein:

the recalculating the reserved space comprises recalculating the reserved space in the cache based on a first proportion of the updated disk capacity of the other storage;

the determining the updated amount of pinnable storage space comprises determining the updated amount of pinnable storage space based on a second proportion of the updated remaining space.

5. The method of claim 1, wherein the disabling the number of pinned volumes includes at least one of:

iteratively unpinning pinned volumes of lowest priority until the amount of pinned volumes updated to reflect one or more unpinned volumes is lower than the updated amount of pinnable storage space; or disabling pinning of all currently pinned volumes.

6. The method of claim 1, wherein the cache is a solid state drive (SSD) cache.

7. The method of claim 6, wherein the other storage is disk storage.

8. The method of claim 1, wherein:

the updated ratio of the capacity of the cache to the capacity of the other storage is the capacity of the cache divided by the updated capacity of the other storage.

9. A non-transitory computer-readable medium storing a computer program for upgrading a data storage system, the computer program being executable to cause a processor to:

calculate an amount of pinnable storage space in a cache of a network storage device after reserving a space in the cache for caching, the network storage device including the cache and other storage to store one or more volumes, wherein pinned volumes of the one or more volumes of the other storage are to have all active volume data cached in the cache;

detect a change in an amount of the other storage in the network storage device;

determine an updated capacity of the other storage;

determine an updated ratio of a capacity of the cache to the capacity of the other storage, based on the updated capacity of the other storage;

recalculate the reserved space in the cache based on the updated capacity of the other storage to update the reserved space in the cache for caching, wherein an updated remaining space in the cache is based on the updated reserved space;

update the amount of pinnable storage space in the cache based on the updated capacity of the other storage and the updated ratio; and in response to a determination that a total amount of pinned data is greater than the updated amount of pinnable storage space in the cache, disable a number of the pinned volumes in the network storage device to bring the total amount of pinned data to below the updated amount of pinnable storage space.

10. The non-transitory computer-readable medium of claim 9, wherein the computer program is executable to cause the processor to:

set the updated amount of pinnable storage space to zero when the updated amount of pinnable storage space initially determined is negative; and disable pinning to the cache of volumes stored in the other storage.

11. The non-transitory computer-readable medium of claim 7, wherein the computer program is executable to cause the processor to:

disable pinning of all currently pinned volumes.

12. The non-transitory computer-readable medium of claim 7, wherein the computer program is executable to cause the processor to:

iteratively unpin pinned volumes of lowest priority until the amount of pinned volumes updated to reflect one or more unpinned volumes is lower than the updated amount of pinnable storage space.

13. The non-transitory computer-readable medium of claim 9, wherein the cache is a solid state drive (SSD) cache.

14. The non-transitory computer-readable medium of claim 13, wherein the other storage is disk storage.

15. The non-transitory computer-readable medium of claim 9, wherein:

the updated ratio of the capacity of the cache to the capacity of the other storage is the capacity of the cache divided by the updated capacity of the other storage.

16. A network storage device comprising:

a cache;

other storage, different than the cache, to store one or more volumes, wherein pinned volumes of the one or more volumes of the other storage are to have all active volume data cached in the cache;

a processor; and a non-transitory computer readable medium storing instructions that are executable to cause the processor to:

calculate an amount of pinnable storage space in the cache after reserving a space in the cache for caching;

detect a change in an amount of the other storage in the network storage device;

determine an updated capacity of the other storage;

determine an updated ratio of a capacity of the cache to the capacity of the other storage, based on the updated capacity of the other storage;

recalculate the reserved space in the cache based on the updated capacity of the other storage to update the reserved space in the cache for caching, wherein an updated remaining space in the cache is based on the updated reserved space;

update the amount of pinnable storage space in the cache based on the updated capacity of the other storage and the updated ratio; and in response to a determination that a total amount of pinned data is greater than the updated amount of pinnable storage space in the cache, disable a number of the pinned volumes in the network storage device to bring the total amount of pinned data to below the updated amount of pinnable storage space.

17. The network storage device of claim 16, wherein the instructions to disable are executable to cause the processor to at least one of:

iteratively unpin pinned volumes of the lowest priority until the amount of pinned volumes updated to reflect one or more unpinned volumes is lower than the updated amount of pinnable storage space; or disable pinning of all currently pinned volumes.

18. The network storage device of claim 16, wherein the cache is a solid state drive (SSD) cache.

19. The network storage device of claim 18, wherein the other storage is disk storage.

20. The network storage device of claim 16, wherein:

the updated ratio of the capacity of the cache to the capacity of the other storage is the capacity of the cache divided by the updated capacity of the other storage.

* * * * *